United States Patent [19]
Runkles et al.

[11] Patent Number: 4,881,760
[45] Date of Patent: Nov. 21, 1989

[54] CONDUIT COUPLING DEVICE WITH REDUNDANCY FEATURES

[75] Inventors: Richard R. Runkles, Englewood; John A. Dyer, Westminster; Jack W. Beyer, Denver, all of Colo.

[73] Assignee: Stanley Aviation Corporation, Aurora, Colo.

[21] Appl. No.: 267,841

[22] Filed: Nov. 7, 1988

[51] Int. Cl.[4] ............ F16L 23/00; F16L 23/04; A41F 1/00

[52] U.S. Cl. .................. 285/93; 24/16 PB; 24/625; 285/373; 285/921

[58] Field of Search ............ 285/373, 112, 419, 365, 285/407, 193, 921; 24/16 R, 16 PB, 30.5 P, 616, 625

[56] References Cited

U.S. PATENT DOCUMENTS

| | | | |
|---|---|---|---|
| 3,154,328 | 10/1964 | Masse | 285/373 X |
| 3,181,189 | 5/1965 | Leyden | 15/22 |
| 3,776,579 | 12/1973 | Gale | 285/373 X |
| 3,999,825 | 12/1976 | Cannon | 285/373 X |
| 4,008,937 | 2/1977 | Filippi | 285/373 X |
| 4,150,464 | 4/1979 | Tracy | 24/77 R |
| 4,534,090 | 8/1985 | Skobel | 24/625 |
| 4,577,377 | 3/1986 | Kasai | 24/625 |
| 4,631,787 | 12/1986 | Kasai | 24/616 |
| 4,639,982 | 2/1987 | Kasai | 24/616 |
| 4,662,040 | 5/1987 | Terrel et al. | 24/625 |
| 4,688,337 | 8/1987 | Dillner et al. | 24/616 |
| 4,712,280 | 12/1987 | Fildan | 24/625 |
| 4,793,637 | 12/1988 | Laipply | 285/93 X |
| 4,795,197 | 1/1989 | Kaminski | 285/903 X |

FOREIGN PATENT DOCUMENTS 0684533  3/1965  Italy ............ 285/373

Primary Examiner—Dave W. Arola
Assistant Examiner—P. Frechette
Attorney, Agent, or Firm—Fields, Lewis, Pittenger & Rost

[57] ABSTRACT

A coupling assembly for connecting adjacent ends of conduits, primarily used for aircraft fuel lines having redundant locking features is provided. This coupling can be manipulated with one hand and includes a central tine and laterally spaced locking tines which engage a mating channel for locking the coupling in secured relationship. Indicia is provided across the locking tines which is not visible when the coupling assembly is completely and securely closed. The coupling assembly can be manipulated with one hand and has viewing ports to be sure that all parts are in place. Also, the tines and guide members are configured to create a force between the two with a longitudinal component tending to open the assembly.

8 Claims, 2 Drawing Sheets

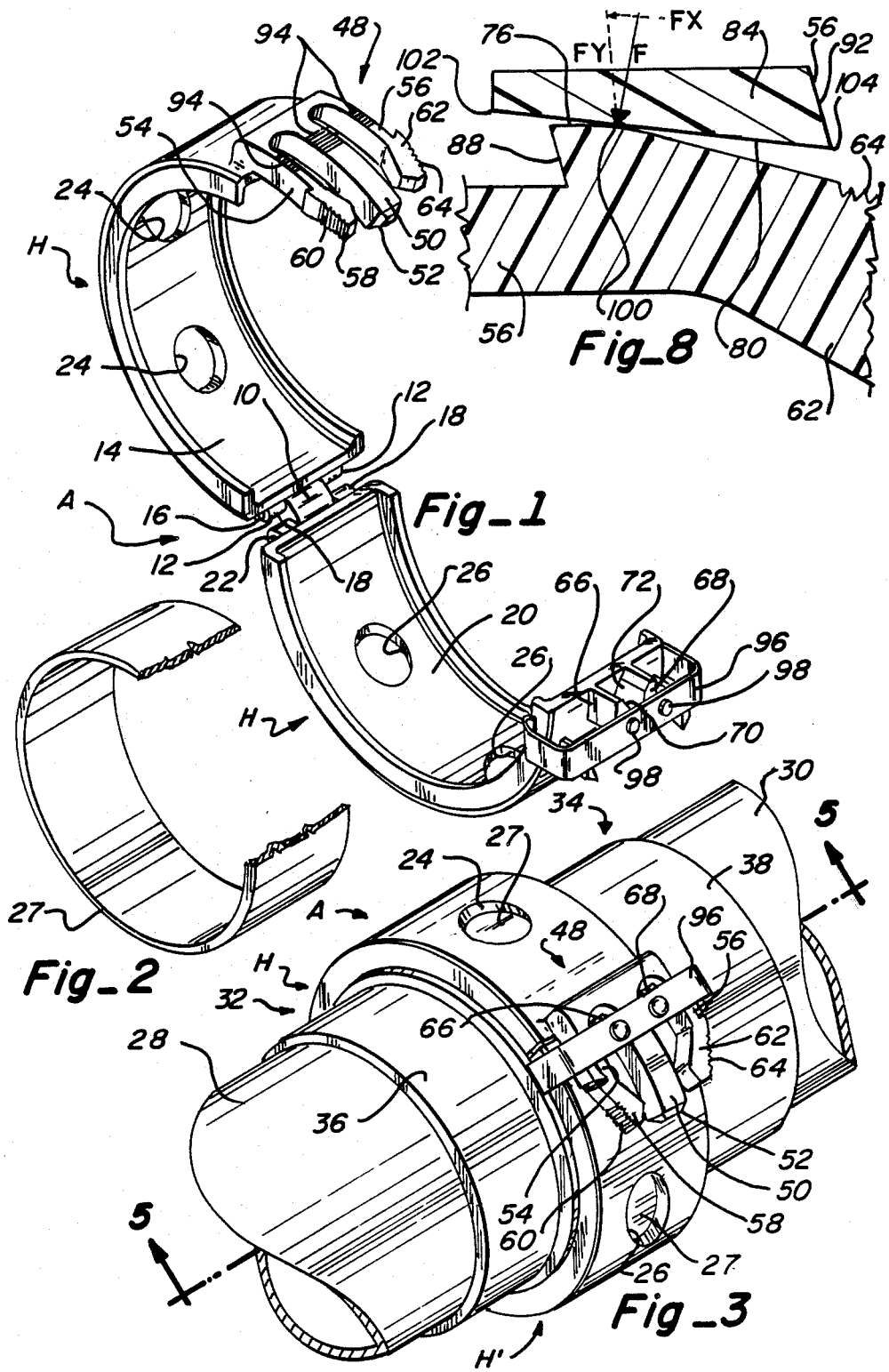

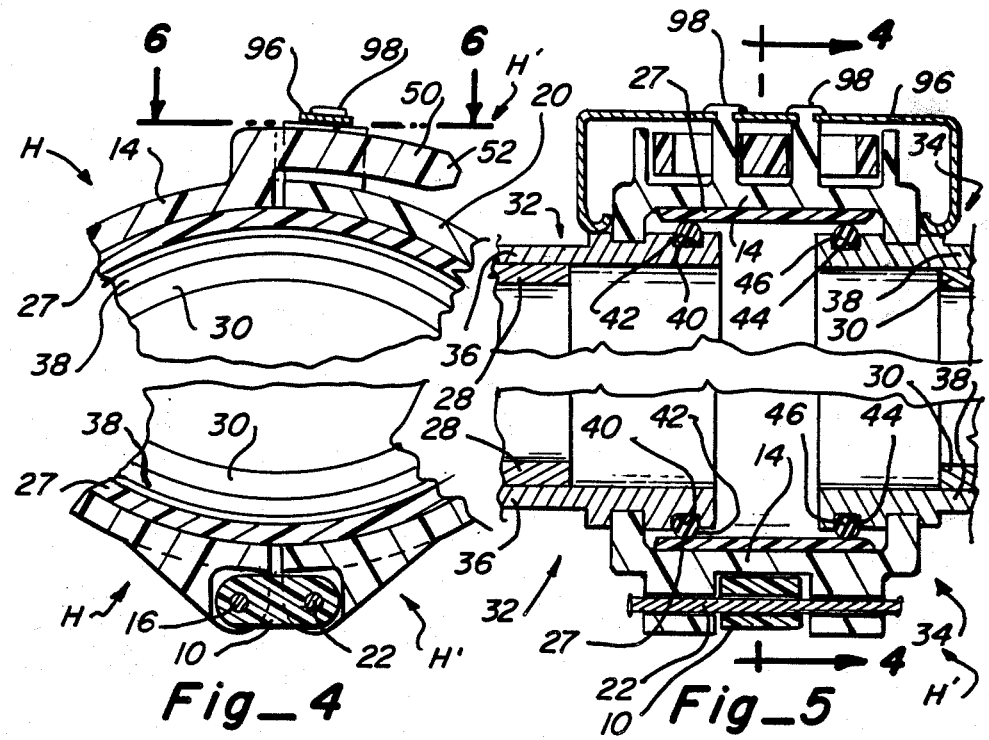
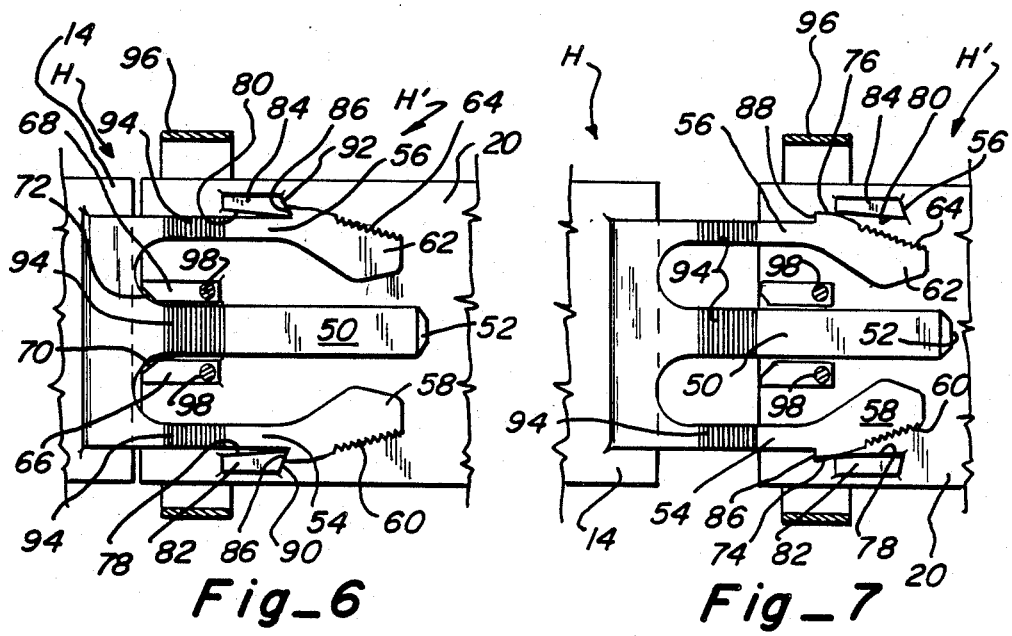

CONDUIT COUPLING DEVICE WITH REDUNDANCY FEATURES

TECHNICAL FIELD

The present invention relates to a coupling assembly, and in particular to a coupling assembly for interconnecting a pair of tubular conduit members in which the coupling assembly has a releasable locking member with redundancy features and indicia to verify whether or not the coupling assembly is completely closed.

BACKGROUND ART

Because of the space confinements within an aircraft, coupling assemblies for interconnecting tubular conduit members are often located at places within the aircraft which are difficult to reach, to see and to service. Thus, it is desirable to have couplings which can be easily manipulated with one hand by the mechanic for closure and which can be visually inspected easily to assure that closure has in fact occurred. In addition, it is necessary that the fastening device used on the coupling have redundancy features to minimize inadvertent opening of the coupling should a latch become damaged.

The latching or locking art is well developed. There are many examples of latching devices having a central tine for guiding the latching mechanisms together and spaced outer tines which are resilient or bendable for moving them between a latched and unlatched position for separating and connecting the latching members. Examples of these are U.S. Pat. No. 3,181,189 to Leyden which shows a latching mechanism for connecting a toothbrush shank to an electric motor. U.S. Pat. No. 4,150,464 to Tracy; U.S. Pat. No. 4,631,787 and U.S. Pat. No. 4,639,982, both to Kasai; U.S. Pat. No. 4,662,040 to Terrell, et al. and U.S. Pat. No. 4,712,280 to Fildan each show buckles for straps wherein one of the members has a central flexible tine spaced on either side of the central tine for receipt in a suitable receiving member. Although each of these devices is satisfactory for its intended purpose, none provides an arrangement wherein the tines are as readily accessible as is desirable in an aircraft configuration nor is there any indicia for identifying whether the clasp is securely fastened or not.

U.S. Pat. No. 4,534,090 to Skobel discloses a latching mechanism having a pair of tines with curved ends which reduces the surface in engagement with the receiving member which will lower the frictional forces on the device when it is being connected or released. However, it has none of the other features of the present invention.

U.S. Pat. No. 4,577,377 to Kasai and U.S. Pat. No. 4,688,337 to Dillner, et al. each disclose a female member having tapered side edges which engage the outer surfaces of the flexible tines. However, there is no indicia to identify whether or not the device is securely fastened nor are the tines arranged in the exposed manner required for access within an aircraft configuration. Nor is the geometry of the devices such that once they are released, they will tend to be urged apart by the reactive forces within the devices.

DISCLOSURE OF THE INVENTION

In accordance with this invention a coupling assembly for releasably interconnecting confronting ends of first and second fluid carrying conduit members is provided. These flanges have a groove therein for receiving a sealing ring. The coupling assembly includes a sleeve circumferentially surrounding the sealing ring and the flanges of the fluid carrying conduit members. A pair of arcuate coupling halves are pivotally joined together at first adjacent ends for circumferentially surrounding the sleeve, each of the coupling halves including an arcuate circumferential wall having a pair of spaced ribs extending inwardly from opposite circumferential edges thereof. A central longitudinal channel is provided on the outer surface of the opposite end of one of the coupling halves. A pair of locking channels are provided on the outer surface of the opposite end of the one coupling half, one of the pair of channels being located on one side of the central channel and the other of the pairs of channels being located on the other side of the central channel, each of the pairs of channels having a locking surface. A central tine is extendable longitudinally from the outer surface of the opposite end of the other of the coupling halves and is aligned for reception within the central channel. A pair of resilient locking tines extend longitudinally from the outer surface of the opposite end of the other of the coupling halves. One of the pair of locking tines is laterally spaced to one side of the central tine and other of the pairs is laterally spaced to the other side of the central tine, each of the locking tines being aligned for reception within the respective pair of locking channels and each has a locking surface which snaps into engagement with the locking surfaces of the respective channels to releasably hold the coupling halves in closed position around the sleeves.

The locking surfaces of the locking tines may be at an acute angle to the sides of the locking tines and the locking surfaces of the locking channels at the same angle as the locking surfaces of the locking tines so that the respective locking surfaces are in parallel mating relationship when the coupling halves are in closed position.

Indicia may be provided on the tines which is only visible when the locking surfaces of the locking tines are not in locking engagement with the locking surfaces of the locking channels.

The central channel may have an entrance for receiving the central tine with tapered guide surfaces on either side of the entrance. A tapered tip on the distal end of the central tine is engageable with the guide surfaces to guide the central tine into the central channel when the coupling halves are closed into locking relationship.

The locking channels each have an outer side edge tapered inwardly in the direction of closing and the locking tines each have an outer edge having a radius so that the outer side edge of each locking channel makes substantially line contact with each of the outer edges of the respective locking tines during closure and release. A bonding jumper can be formed across the outer surface of the channels and extend transversely across one of the coupling halves. The bonding jumper can be positioned so as to cover the indicia when the coupling assembly is in locked position.

More specifically, the locking tines may have enlarged distal ends with a curved outer surface to provide line contact with raised locking surfaces and be bendable inwardly against the central tine only a sufficient distance to release the locking tines from the locking surfaces for release. The force along the line contact has a component force in the unlocking direction which tends to cause the tines to move into the unlocked position after being released. This same force resists closing the tines but assures that the operator will squeeze the halves of the clamp tightly together until the tines snap into locked position.

The advantages of the present invention will be readily apparent. With this device the coupling can be closed or released very easily by a mechanic using only one hand. Furthermore, the locking tines will be clearly visible and accessible in a portion of the aircraft having restrictive access. With the indicia across the tines, it will be easy for the mechanic to tell whether the coupling assembly is latched or not. If it is latched, the indicia will not be visible because it will be hidden by a transverse bonding jumper. If the coupling is not securely latched at least a portion of the indicia will be visible warning the mechanic so that he can make suitable corrections, such as reconnecting the coupling or replacing it if it is defective. The geometry of the tines and locking surfaces create a component force urging the tines toward unlocked position once they are released.

Additional advantages of this invention will become apparent from the description which follows, taken in conjunction with the accompanying drawings

BRIEF DESCRIPTION OF THE DRAWINGS

FIG. 1 is a perspective view of the coupling assembly of this invention in open position;

FIG. 2 is a perspective view of a sleeve which is received within the coupling assembly and forms a part thereof;

FIG. 3 is a fragmentary perspective view showing the coupling assembly connecting confronting conduit ends;

FIG. 4 is a fragmentary vertical section, taken along line 4—4 of FIG. 5, showing details of the hinge and tine construction;

FIG. 5 is a fragmentary, enlarged, horizontal section, taken along line 5—5 of FIG. 3, showing further details of the coupling assembly;

FIG. 6 is a fragmentary horizontal section, taken along line 6—6 of FIG. 4, showing the tines in locked position;

FIG. 7 is a horizontal section, similar to FIG. 6, but showing the tines as they are either moving into or out of locked position; and FIG. 8 is a greatly enlarged fragmentary plan view of a tine and guide member including a force diagram to show the forces applied.

BEST MODE FOR CARRYING OUT THE INVENTION

In accordance with this invention, a coupling assembly A is provided which comprises a first coupling half H and a second coupling half H' having first ends pivotally joined together by a hinge link 10. The hinge link is connected between a pair of ears 12 formed on the arcuate surface 14 of coupling half H by pivot pin 16. Similarly, hinge link 10 is pivoted between a second pair of ears 18 on the arcuate surface 20 of coupling half H' by a pivot pin 22. Alternatively, the hinge link 10 can be omitted and a single pivot can be provided between the coupling halves H and H'. However, with the link in place, more relative movement between the two halves is possible which better facilitates assembly and removal of the coupling assembly A, particularly in tight quarters. Advantageously, arcuate surface 14 has spaced openings 24 and arcuate surface 20 has space openings 26 which have the dual purpose of reducing the weight of the coupling, without substantially reducing the strength, and of providing a viewing opening for observing whether or not coupling ring 27 is in place.

Referring to FIG. 3, the coupling assembly A interconnects a pair of fluid carrying tubes or conduits 28 and 30. Sealing flanges 32 and 34 are connected to conduits 28 and 30 by means of skirts 36 and 38 respectively. As best seen in FIG. 5, sealing flange 32 is provided with a recess 40 for receiving a sealing ring 42 which bears against coupling ring 27 to form a seal. Similarly, sealing flange 34 is provided with a recess 44 for receiving a sealing ring 46 which bears against coupling ring 27.

The ends of coupling halves H and H' opposite the hinge have cooperating latch means. The latch means for coupling half H includes a male locking member 48 having a central tine 50 with a tapered distal end 52 and laterally spaced locking tines 54 and 56 on opposite sides thereof. These locking tines are identical but reversed in shape and have a narrow arm which extends parallel to but spaced from central tine 50 and is formed integrally with coupling half H. Locking tine 54 has an enlarged head or distal end 58. The end has a tapered serrated edge 60 for pressing the tine inwardly toward central tine 50 for releasing the latch mechanism, as will be described more fully below. The opposite locking tine 56 includes an enlarged distal end 62 having a tapered serrated edge 64, also to assist in releasing the locking means.

The end of coupling half H' opposite the hinge has a pair of spaced raised elements 66 and 68 to form a guide or channel for receiving central tine 50. Conveniently, these have internal angled guide surfaces 70 and 72 respectively for receiving the tapered end 52 of tine 50 for guiding it into the channel formed between raised elements 66 and 68.

As the locking mechanism is closed, outer curved surfaces 74 and 76 of tines 54 and 56, respectively, will engage inwardly canted or tapered cam surfaces 78 and 80 of raised guide members 82 and 84, respectively. The relationship between these surfaces is best illustrated in FIG. 7. As the locking mechanism continues to be closed, the locking tines 54 and 56 will be bent inwardly as surface 74 slides passed surface 78 and surface 76 slides passed surface 80. When the locking tines reached the position shown in FIG. 6, they spring outwardly due to their natural resilience. As the locking tines spring outwardly, a locking lip 86 and 88 respectively, locks behind a locking edge 90 and 92 on the ends of guide members 82 and 84, respectively.

Conveniently, indicia 94 extends across the tines as shown and is hidden by bonding jumper 96 which is attached to raised elements 66 and 68, as by rivets 98. Thus, when the coupling assembly is locked in place around the conduit ends, as shown in FIG. 3, the indicia will be hidden. By this means, a visual examination of the coupling will show whether or not it is in proper locked position. If it is released or partially released, the indicia will show to the side of the bonding jumper. The indicia may be in the form of a contrasting color or notches which are easily visible, even in a remote location in an aircraft.

To release the coupling, the operator need merely squeeze in on the serrated tapered edges 60 and 64 of locking tines 54 and 56, respectively which will provide both an inward and longitudinal force. The possibility of the tines breaking is greatly minimized by the enlarged ends thereof which will engage central tine 50 just beyond the point of release of the locking edges. Because curved surfaces 74 and 76 engage cam surfaces 78 and 80 respectively, along a line, there is very little friction and therefore the coupling will easily spring apart.

Also, the angular relationship of the parts creates a force tending to move the coupling halves in the separating direction for easy removal. Referring to FIG. 8, it can be seen that curved surface 76 engages cam surface 80 along a line 100. A force F is exerted along this line as shown and has a force component FX tending to move tine 62 in the releasing direction. This assists in releasing the tines when they are squeezed inwardly so that the corner 102 of locking lip 88 is released from corner 104 of locking edge 92 and the force component FX of force F assists in opening the clamp. Conversely, when the clamp is squeezed together into locking position, the force FX must be overcome by the operator and the two coupling halves squeezed together until corner 102 snaps over corner 104 into locked position, as shown in FIG. 6.

From the foregoing, it is apparent that a coupling assembly has been provided for use on an aircraft which is lightweight, easy to use, and has redundant tines for assuring that should one of them become broken or damaged that the device will not easily separate. Because of the indicia provided the coupling assembly can be easily examined to be sure that it is in closed position. When released the geometry is such that the coupling tends to move toward the unlocked position to assure that the indicia will be exposed.

This invention has been described in detail with reference to a particular embodiment thereof, but it will be understood that various other modifications can be effected within the spirit and scope of this invention.

We claim:

1. A coupling assembly for releasably interconnecting confronting ends of first and second fluid carrying conduit members wherein each has an annular flange fixedly attached to each of the confronting ends, each flange having means defining an external peripheral groove and a sealing ring positioned in each of the flange grooves, said assembly comprising:

a sleeve for circumferentially surrounding the sealing rings and the flanges;

a pair of arcuate coupling halves pivotally joined together at first adjacent ends for circumferentially surrounding said sleeve, each of said coupling halves including an arcuate circumferential wall having a pair of spaced ribs extending inwardly from opposite circumferential edges thereof;

a central longitudinal channel on the outer surface of the opposite end of one of said coupling halves;

a pair of longitudinal locking channels on the outer surface of said opposite end of said one coupling half, one of said pair of channels being located on one side of said central channel and the other of said pair of channels being located on the other side of said central channel, each of said pair of channels having a locking surface and an inner side edge tapered inwardly in the longitudinal direction of tine movement during closing;

a central tine extending longitudinally from the outer surface of the opposite end of the other of said coupling halves, being aligned for reception within said central channel; and a pair of resilient locking tines extending longitudinally from the outer surface of the opposite end of said other of said coupling halves, one of said pair of locking tines being laterally spaced to one side of said central tine and the other of said pair of locking tines being laterally spaced to the other side of said central tine, each of said locking tines being aligned for reception within said respective pair of locking channels and each having an outer edge with a radius so that each said inner side edge of said locking channels makes substantially line contact with each of said outer edges of said respective locking tines during closure and release and each further including a locking surface which snaps into engagement with locking surfaces of said respective locking channels to releasably hold said coupling halves in closed position around said sleeve.

2. Apparatus, as claimed in claim 1 wherein:

said locking surfaces of said locking tines are at an acuate angle to the direction of movement of said locking tines and are releasable from said locking surfaces of said locking channel by squeezing the ends thereof toward said central tine and toward each other and said locking surfaces of said locking channels are at the same acute angle as said locking surfaces of said locking tines so that said respective locking surfaces are in parallel mating relationship when said coupling halves are in closed position causing said coupling halves to be moved closer together when said tines are squeezed inwardly before said locking tine surfaces can be released from said locking surfaces of said locking channels.

3. Apparatus, as claimed in claim 1, wherein:

a force is exerted along said line contact which has a component tending to force said coupling halves apart.

4. Apparatus, as claimed in claim 1, further including:

a bonding jumper forming the outer surface of said channels and extending transversally across said one coupling half.

5. A coupling assembly for releasably interconnecting confronting ends of first and second fluid carrying conduit members wherein each has an annular flange fixedly attached to each of the confronting ends, each flange having means defining an external peripheral groove and a sealing ring positioned in each of the flange grooves, said assembly comprising:

a sleeve for circumferentially surrounding the sealing rings and the flanges;

a pair of arcuate coupling halves, having a centerline of symmetry, pivotally joined together at first adjacent ends for circumferentially surrounding said sleeve, each of said coupling halves including an arcuate circumferential wall having a pair of spaced ribs extending inwardly from opposite circumferential edges thereof;

a pair of guide surfaces closely spaced on opposite sides of the centerline of symmetry on the outer surface of the opposite end of one of said halves;

a pair of elements each having locking surfaces spaced outwardly of said pair of guide surfaces and including inner side edges which taper toward said centerline of symmetry in the direction of closure;

a central tine extending longitudinally from the outer surface of the opposite end of the other of said coupling halves being aligned for reception between said pair of guide surfaces; and a pair of resilient locking tines extending longitudinally from the outer surface of the opposite end of said other of said coupling halves, said locking tines being spaced on opposite sides, respectively, of said central tine, each of said locking tines being aligned for reception between one of said guide surfaces and one of said locking surfaces so that said locking tines snap into engagement with said respective locking surfaces to releasably hold said coupling halves in closed position around said sleeve, said locking tines having inwardly tapered outer surfaces adjacent the distal ends thereof, which are at a greater angle than the taper of said inner edges so that only a substantially line contact is created between these surfaces to facilitate easy passage of said outer surfaces of said tines past said locking surfaces.

6. Apparatus, as claimed in claim 5, wherein:
a force is exerted along said line contact which has a component tending to force said coupling halves apart.

7. Apparatus, as claimed in claim 5, wherein:
said locking tines have a reduced cross-section at their proximate end so that they are bendable for releasably locking and sliding along said locking surfaces.

8. Apparatus, as claimed in claim 5, further including:
a bonding jumper extending laterally across said raised guide surfaces and said raised locking cams and attached thereto; and
indicia extending laterally across a portion of the proximate ends of said central tine and said locking tines positioned so as to be hidden from view under said bonding jump when said coupling halves are in closed position.

* * * * *